United States Patent
Rao

(10) Patent No.: US 7,069,396 B2
(45) Date of Patent: Jun. 27, 2006

(54) DEFERRED MEMORY ALLOCATION FOR APPLICATION THREADS

(75) Inventor: Raghav Rao, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 670 days.

(21) Appl. No.: 10/184,863

(22) Filed: Jun. 27, 2002

(65) Prior Publication Data

US 2004/0003188 A1    Jan. 1, 2004

(51) Int. Cl.
  *G06F 12/00*  (2006.01)
  *G06F 9/46*   (2006.01)
(52) U.S. Cl. .................. 711/154; 718/104; 711/158; 711/170
(58) Field of Classification Search ........ 711/154, 711/170–171, 118, 147, 151, 158; 718/100, 718/104; 719/312, 314, 328; 717/168, 170; 707/205; 710/39, 244
See application file for complete search history.

(56) References Cited

U.S. PATENT DOCUMENTS

| | | | |
|---|---|---|---|
| 5,809,554 A * | 9/1998 | Benayon et al. | 711/171 |
| 6,088,764 A * | 7/2000 | Shyam et al. | 711/112 |
| 6,230,247 B1 * | 5/2001 | Cannon et al. | 711/171 |
| 6,233,666 B1 * | 5/2001 | Mathews et al. | 711/203 |
| 6,629,227 B1 * | 9/2003 | Jerding et al. | 711/170 |

FOREIGN PATENT DOCUMENTS

WO    WO01/61471    8/2001

OTHER PUBLICATIONS

Noble et al: "Small Memory Software: Patterns for Systems with Limited Memory . . . " Nov. 9, 2000, Addison-Wesley Professional, XP002327210 pp. 222-223.

Vo K-P et al: "Xept: A Software Instrumentation Method for Exception Handling" Software Reliability Engineering, Proceedings., The 8th Intmanl Symposium. Nov. 2, 1997 pp. 60-69.

Lea Douglas: Concurrent Programming in JAVA (TM): Design Principles and Patterns (2nd Edition) Nov. 5, 1999, Addison-Wesly Professional, XP002327248. pp. 165.

* cited by examiner

*Primary Examiner*—Denise Tran

(57) ABSTRACT

Various systems and methods are provided that facilitate deferred memory allocation. In one method, an attempt to allocate an amount of memory for an application thread is made. If the attempt was unsuccessful and if the application thread is designated for deferred memory allocation, then the application thread is stored in a holding queue. Once the application thread is stored in the holding queue, periodic attempts are made to reallocate the amount of memory for the application thread.

27 Claims, 4 Drawing Sheets

DEFERRED MEMORY ALLOCATION FOR APPLICATION THREADS

BACKGROUND

Currently, various computer systems such as laptops, desktops, workstations, personal digital assistants (PDAs) and other systems may include a number of applications that are executed thereon. Such applications may include, for example, word processors, spreadsheets, calendars, task tracking systems, and other applications. Due to the increasing size of the various applications that may be executed on existing computer systems, it is often the case that there is not enough memory that can be allocated for the execution of various applications/application threads generated by these applications. This is especially the case given that a user may execute a number of applications on a computer system concurrently. If no additional memory is available when a user attempts to execute a particular application or take other action that requires the allocation of memory, then the computer system may respond by providing a message that memory was unavailable. In such case, the attempted execution is aborted which creates frustration and limits the usefulness of the computer system.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
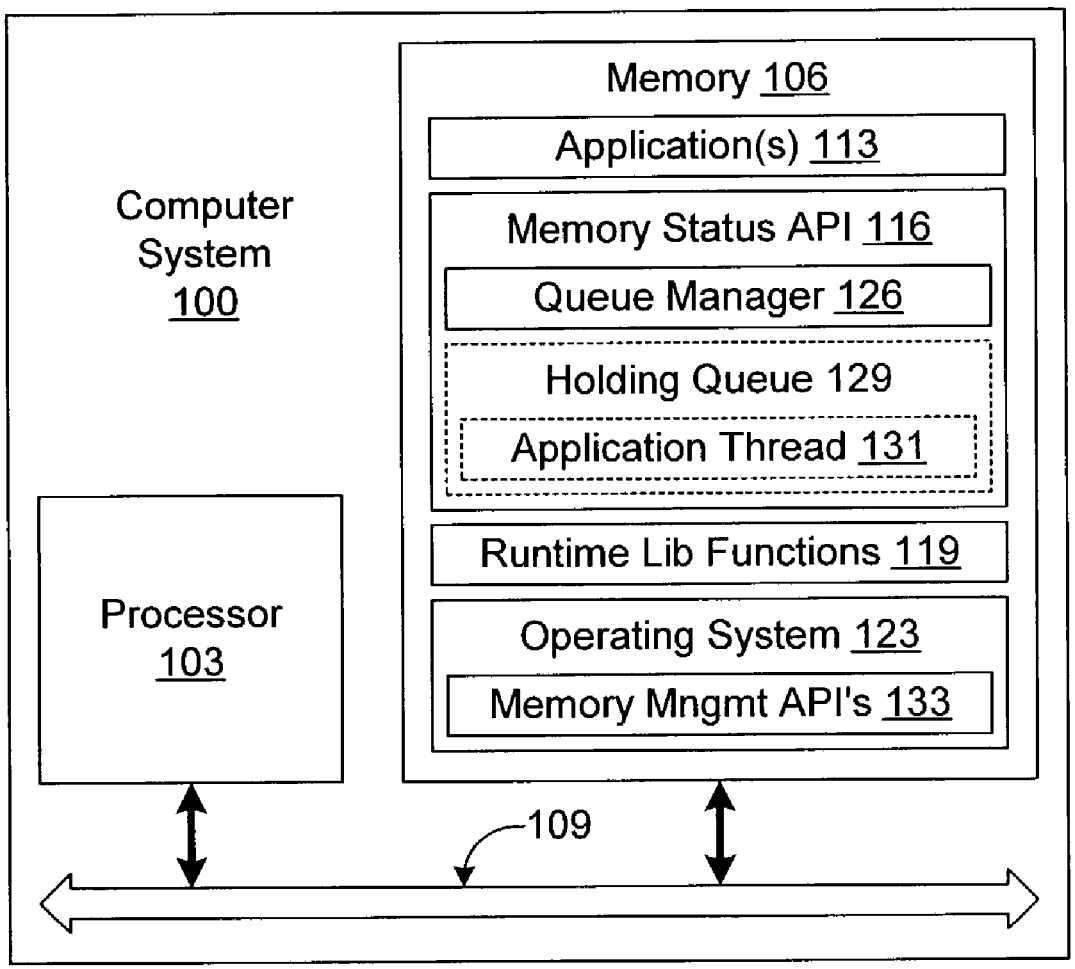
FIG. 1 is a schematic of a computer system that employs an exemplary memory status application programming interface (API) according to an embodiment of the present invention.

With reference to FIG. 1, shown is a schematic of a computer system 100 according to an embodiment of the present invention. In this respect, the computer system 100 includes a processor circuit having a processor 103 and a memory 106, both of which are coupled to a local interface 109. In this respect, the computer system 100 may be, for example, a general-purpose computer, a personal digital assistant, a laptop, a workstation, or other apparatus with like capability.

Stored in the memory 106 and executable by the processor 103 are several software components that include one or more applications 113, a memory status application programming interface (API) 116, a number of runtime library functions 119, and an operating system 123. The application 113 may be, for example, word processor programs, spreadsheet programs, browsers, or any other application given that virtually thousands, if not millions, of applications have been created. The memory status API 116 includes a queue manager 126 and a holding queue 129. Stored in the holding queue 129 is/are one or more application threads 131 that are generated by corresponding one or more applications 113. The operation of the memory status API 116, the queue manager 126 and the holding queue 129 provide for deferred memory allocation as will be discussed. Also, the operating system 123 includes memory management APIs 133 that operate to control allocation of the memory 106.

The memory 106 is defined herein as both volatile and nonvolatile memory and data storage components. Volatile components are those that do not retain data values upon loss of power. Nonvolatile components are those that retain data upon a loss of power. Thus, the memory 106 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 103 may represent multiple processors and the memory 106 may represent multiple memories that operate in parallel. In such a case, the local interface 109 may be an appropriate network that facilitates communication between any two of the multiple processors, between any processor and any one of the memories, or between any two of the memories etc. The processor 103 may be electrical, molecular, or optical in nature.

The operating system 123 is executed to control the allocation and usage of hardware resources in the computer system 100 such as the memory, processing time and peripheral devices. In this manner, the operating system 123 serves as the foundation on which applications depend as is generally known by those with ordinary skill in the art. The specific memory allocation functions of the operating system 123 are performed by the memory management API's 133 and other portions of the operating system 123.

Next, a general description of the operation of the computer system 100 according to an embodiment of the present invention is described. To provide context for the following discussion, assume that one or more of the applications 113 have been executed by the processor 103 and are stored in a portion of the memory 106 such as, for example, random access memory or virtual memory to facilitate the execution thereof. Also assume that the user of the computer system 100 may wish to execute a further application 113 in addition to those already executed. As such, the new application 113 generates a request for memory or application thread 131 that is applied to the memory status API 116. Alternatively, rather than execute a further application 113, a user may employ a feature of a currently executed application 113 that my require allocation of additional memory.

The application thread 131 calls the memory status API 116 to allocate memory. The memory status API 116 then calls appropriate ones of the runtime library functions 119 to attempt to allocate memory for the execution of the new application 113. In one circumstance, a portion of the memory 106 that is employed to facilitate the execution of the application 113 may include enough available memory to accommodate the new application thread. As such, the memory management APIs 133 allocate the needed memory and return a memory pointer to the runtime library functions 119. The runtime library functions 119 return the memory pointer to the memory status API 116 which in turn provides such information to the new or existing application 113 requesting the allocation of memory. Thereafter, the new application 113 or additional feature of a currently executed application 113 is executed using the memory identified by the memory pointer for operation. In such case, the memory status API 116 simply passes through the memory allocation request to the runtime library functions 119.

However, in some circumstances, there may not be enough of the needed portion of the memory 106 to accommodate the application thread 131. As such, the memory management APIs 133 return a failure to allocate the memory to the runtime library functions 119 which, in turn, provide the failure to allocate memory to the memory status API 116. The memory status API 116 then determines whether the application thread 131 has been designated for deferred memory allocation. If the application thread 131 is so designated, then it can be stored in the holding queue 129 to await further attempts to reallocate a portion of the memory 106 to accommodate the new application 113.

If the application thread 131 is designated for deferred memory allocation, then the memory status API 116 places the application thread 131 in the holding queue 129. The designation of the application thread 131 for deferred memory allocation may take any one of multiple forms. For example, in one instance, the application thread 131 may be designated to be held in the holding queue 129 for a predetermined period of time. Alternatively, the application thread 131 may be designated to be held indefinitely until memory is available. Where the application thread 131 is to be stored in the holding queue 129 for a predetermined period of time, a storage turnout is associated with the application thread 131 by the originating application 113 that indicates a maximum period of time that the application thread 131 can be stored in the holding queue 129. If the application thread 131 is designated for indefinite storage in the holding queue 129, then the application thread 131 is held in the holding queue 129 until memory has been allocated for the execution thereof.

If the application thread 131 has been designated for temporary storage in the holding queue 129 by virtue of having a storage timeout associated therewith, then the application thread 131 will be stored in the holding queue 129 for the predetermined storage timeout. Upon an expiration of the storage timeout, the application thread 131 is removed from the holding queue 129 and a failure to allocate the amount of memory for the application thread 131 is returned to the respective application 113.

In addition, it may be the case that an application 113 designates an application thread 131 for non-deferred memory allocation. In such case, if the memory status API 116 receives a failure to allocate the memory for such an application thread 131 from the runtime library function 119, then the memory status API 116 immediately returns the failure to allocate the memory for the application thread 131 to the respective application 113 that originated the application thread 131. Thus, in generating application threads 131 for required memory allocation, the application 113 assign a designation to the application thread 131 as to whether or not deferred memory allocation is to be used. This may done, for example, by setting one or more flags associated with the application thread 131 that indicate whether deferred memory allocation applies. In addition, in cases where temporary memory allocation is to be used, the applications 113 assign a storage timeout thereto.

The queue manager 126 operates to maintain the holding queue 129. Specifically, the queue manager 126 operates "in the background" of the memory status API 116 and attempts to reallocate memory for application threads 131 that are stored therein. The queue manager 126 removes application threads 131 from the holding queue 129 when memory has been successfully allocated therefor. In addition, the queue manager 126 tracks the countdown of all storage timeouts associated with any application threads 131 held in the holding queue 129 and removes such application threads 131 from the holding queue 129 when the storage timeouts have expired. Upon an expiration of a storage timeout, the queue manager 126 also returns a failure to allocate memory to the appropriate application 113 for the expired application thread 131.

Figure 2:
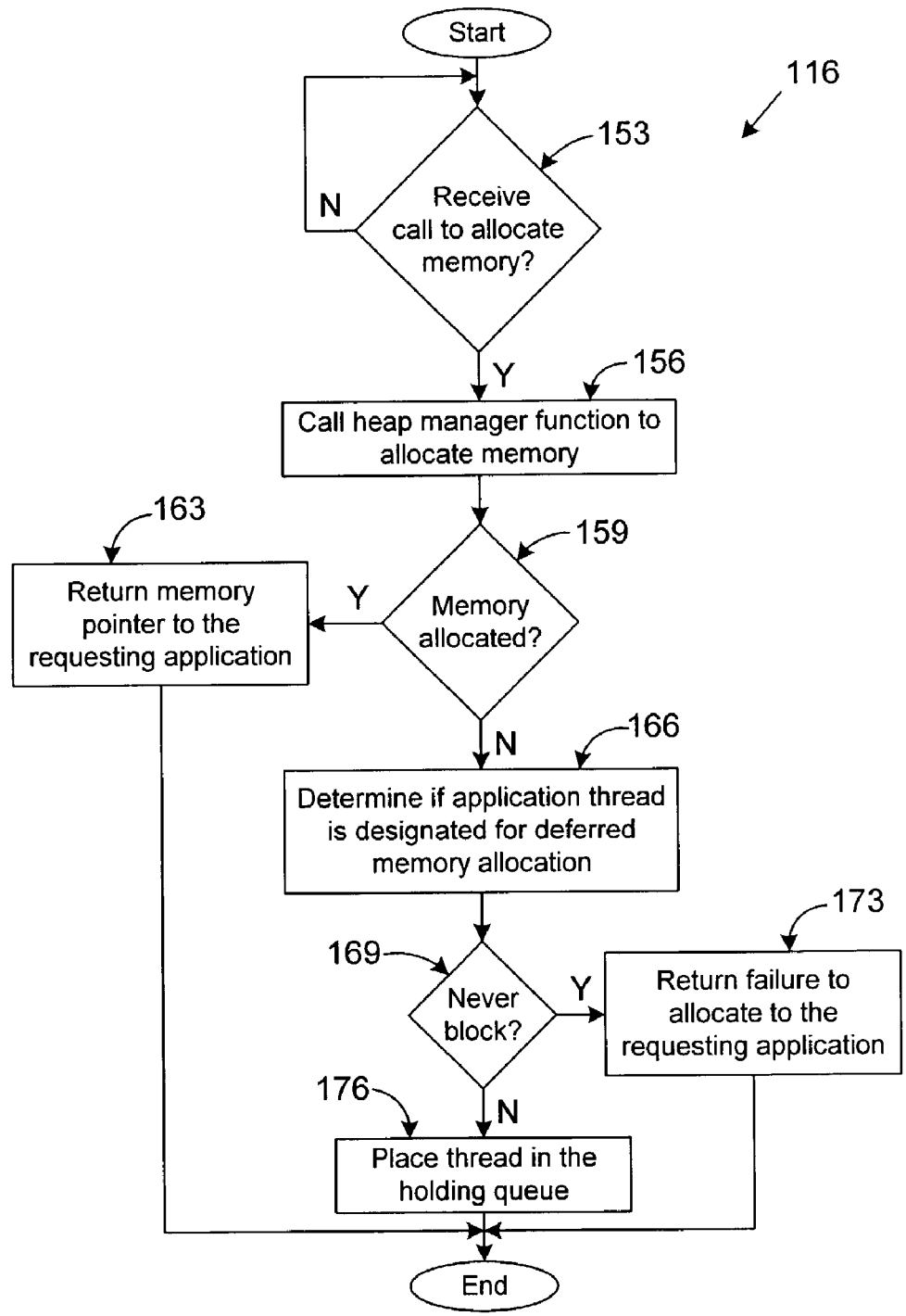
FIG. 2 is an exemplary flow chart that illustrates the operation of the memory status API of FIG. 1.

With reference then to FIG. 2, shown is an exemplary flow chart of the operation of the memory status API 116 in processing calls to allocate memory received from applications 116 for specific application threads 131 (FIG. 1). Alternatively, the flow chart of FIG. 2 may be viewed as depicting steps of a method implemented in the computer system 100 (FIG. 1) to facilitate deferred memory allocation.

Beginning with box 153, the memory status API 116 waits to receive a call to allocate memory from a specific application thread 131. If such is received, then in box 156, the memory status API 116 calls heap manager functions in the runtime library functions 119 (FIG. 1) to allocate the memory. In box 159, the memory status API 116 determines whether memory has been successfully allocated for the current application thread 131. This determination is made, for example, based upon the response returned from the runtime library functions 119 called by the memory status API 116. If memory has successfully been allocated, then the memory status API proceeds to box 163 in which the memory pointer for the allocated memory is returned to the requesting application so that the application thread 131 may be executed accordingly. Thereafter, the operation of the memory status API 116 ends.

On the other hand, if memory is not successfully allocated as determined in box 159, then the memory status API 116 proceeds to box 166 in which the memory status API 116 determines if the application thread 131 has been designated for deferred memory allocation. This may be done, for example, by examining flags that are associated with the application thread 131 that provide such an indication. Thereafter, in box 169, if the application thread 131 has not been designated for deferred memory allocation then the memory status API 116 proceeds to box 173 in which the failure to allocate the memory is returned to the requesting application 116. Thereafter, the operation of the memory status API 116 ends.

However, if in box 169 the application thread 131 has been designated for deferred memory allocation, then the memory status API 116 proceeds to box 176 in which the application thread 131 is placed in the holding queue 129. Thereafter, the operation of the memory status API 116 ends. In this manner, the memory status API 116 places appropriate application threads 131 into the holding queue 129 (FIG. 1) to facilitate deferred memory allocation for those application threads 131 that are so designated.

Figure 3:
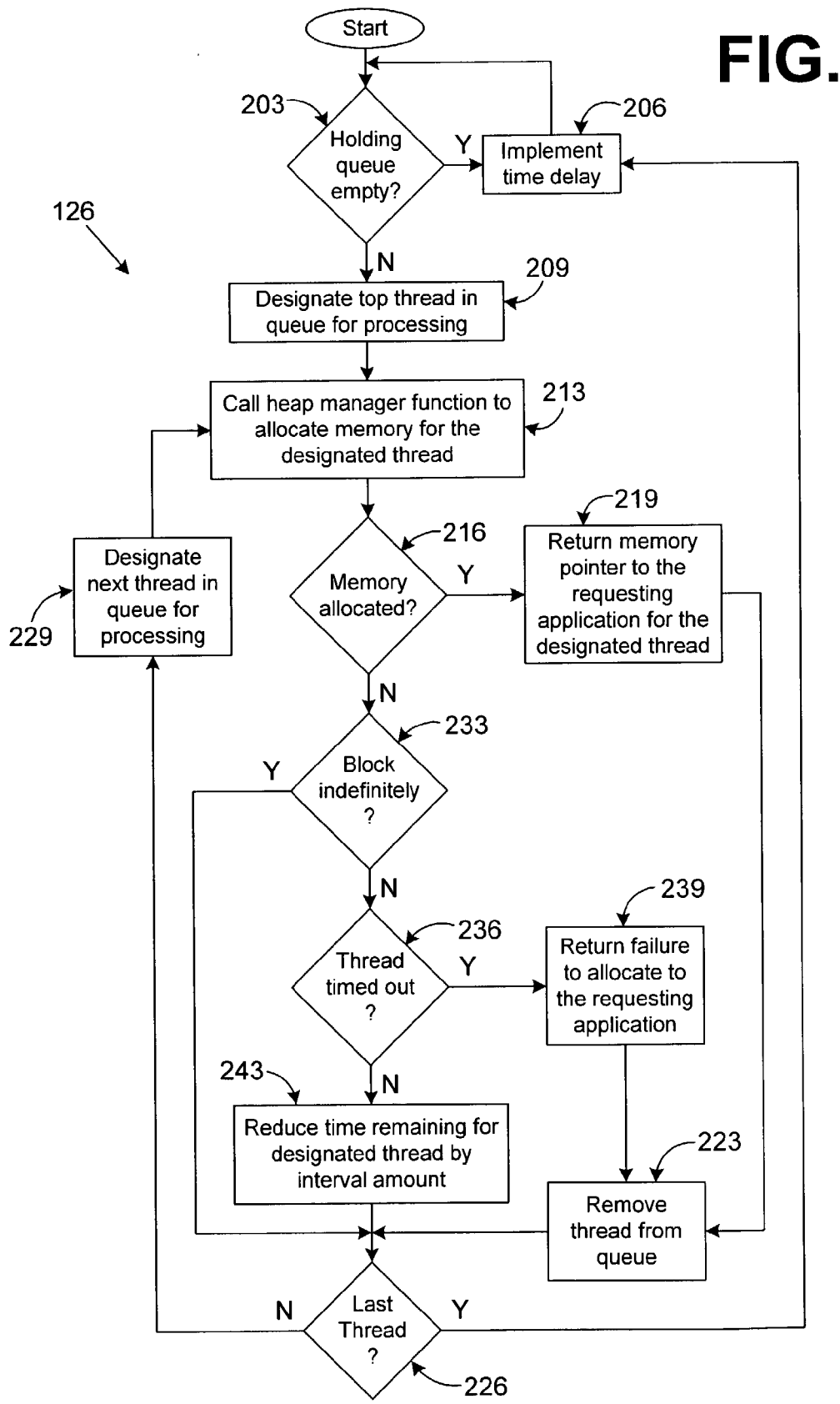
FIG. 3 is an exemplary flow chart that illustrates the operation of a memory status thread that operates as a portion of the memory status API of FIG. 1.

Turning then to FIG. 3, shown is an exemplary flow chart that provides an example of the operation of the queue manager 126 according to an embodiment of the present invention. The queue manager 126 operates continuously in the background of the memory status API 116 to maintain the holding queue 129 (FIG. 1). Alternatively, the flow chart of FIG. 3 may be viewed as depicting steps of a method implemented in the computer system 100 (FIG. 1) to maintain the holding queue 129.

Beginning with box 203, the queue manager 126 determines whether the holding queue 129 is empty. If so, then the queue manager 126 proceeds to box 206 in which a time delay is implemented for a predetermined period of time. In one embodiment, this time delay is approximately 10 milliseconds in duration, although any length of time may be used. Thereafter, the queue manager 126 reverts back to box 203.

Assuming that the holding queue is not empty in box 203, then the queue manager 126 proceeds to box 209. In box 209, the top application thread 131 (FIG. 1) in the holding queue 129 is designated for further processing. Thereafter, in box 213, the queue manager 126 calls the heap manager function included in the runtime library functions 119 (FIG. 1) to allocate memory for the designated application thread 131. Then, in box 216, the queue manager 126 determines whether the memory was successfully allocated based upon the return of either a memory pointer or failure to allocate the memory from the runtime library functions 119. If the memory is successfully allocated in box 216, then the queue manager 126 proceeds to box 219 to return the memory pointer for the allocated memory back to the requesting application 113 that generated the designated application thread 131. The queue manager 126 then proceeds to box 223 in which the designated application thread 131 is removed from the holding queue 129.

Once the application thread 131 is removed from the holding queue 129, then the queue manager 126 proceeds to box 226 to determine whether the last application thread 131 has been processed in the holding queue 129. If the last application thread 131 listed in the holding queue 129 has not been processed, then the queue manager 126 proceeds to box 229 to designate the next application thread 131 in the holding queue for processing. Thereafter, the queue manager 126 reverts back to box 213. On the other hand, if in box 226 the last application thread 131 in the holding queue 129 has been processed, then the queue manager 126 reverts back to box 206.

Referring back to box 216, if memory has not been successfully allocated for the designated application thread 131, then the queue manager 126 proceeds to box 233 in which it is determined whether the application thread 131 is to be held in the holding queue 129 indefinitely. If such is the case, then the queue manager 126 proceeds to box 226. This application thread 131 will remain in the holding queue 129 until a successful attempt to allocate memory for such application thread 131 occurs. In order to determine whether or not the application thread 131 is to be held in the holding queue 129 indefinitely, the queue manager 126 may examine appropriate flags or other characteristics of the application thread 131 itself that provide such information.

Assuming that the application thread 131 is not to be maintained in the holding queue 129 indefinitely in box 233, then the queue manager 126 proceeds to box 236 in which it is determined whether a storage timeout associated with the application thread 131 has expired. If such is the case, then in box 239 the queue manager 126 returns a failure to allocate memory for the respective application thread 131 to the respective application 113 (FIG. 1) from which the application thread 131 originated. Thereafter, the queue manager 126 moves to box 223 in which the designated application thread 131 is removed from the holding queue 129.

However, if in box 236 the storage timeout has not expired, then in box 243 the queue manager 126 reduces the time remaining for the designated application thread 131 by a predetermined interval amount. In this manner, the storage timeout is reduced every time the queue manager 126 attempts to reallocate memory therefore until a value of zero is achieved, thereby indicating that the storage timeout has expired. Once the storage timeout has been reduced in box 243, then the queue manager 126 proceeds to box 226.

Thus, the queue manager 126 provides a continuous loop in which repeated attempts to reallocate memory for those application threads 131 in the holding queue 129 are made until either a failure to allocate the appropriate memory for the respective application threads 131 is reported to the originating application 113 or memory is successfully allocated for the respective allocation threads 131.

Figure 4:
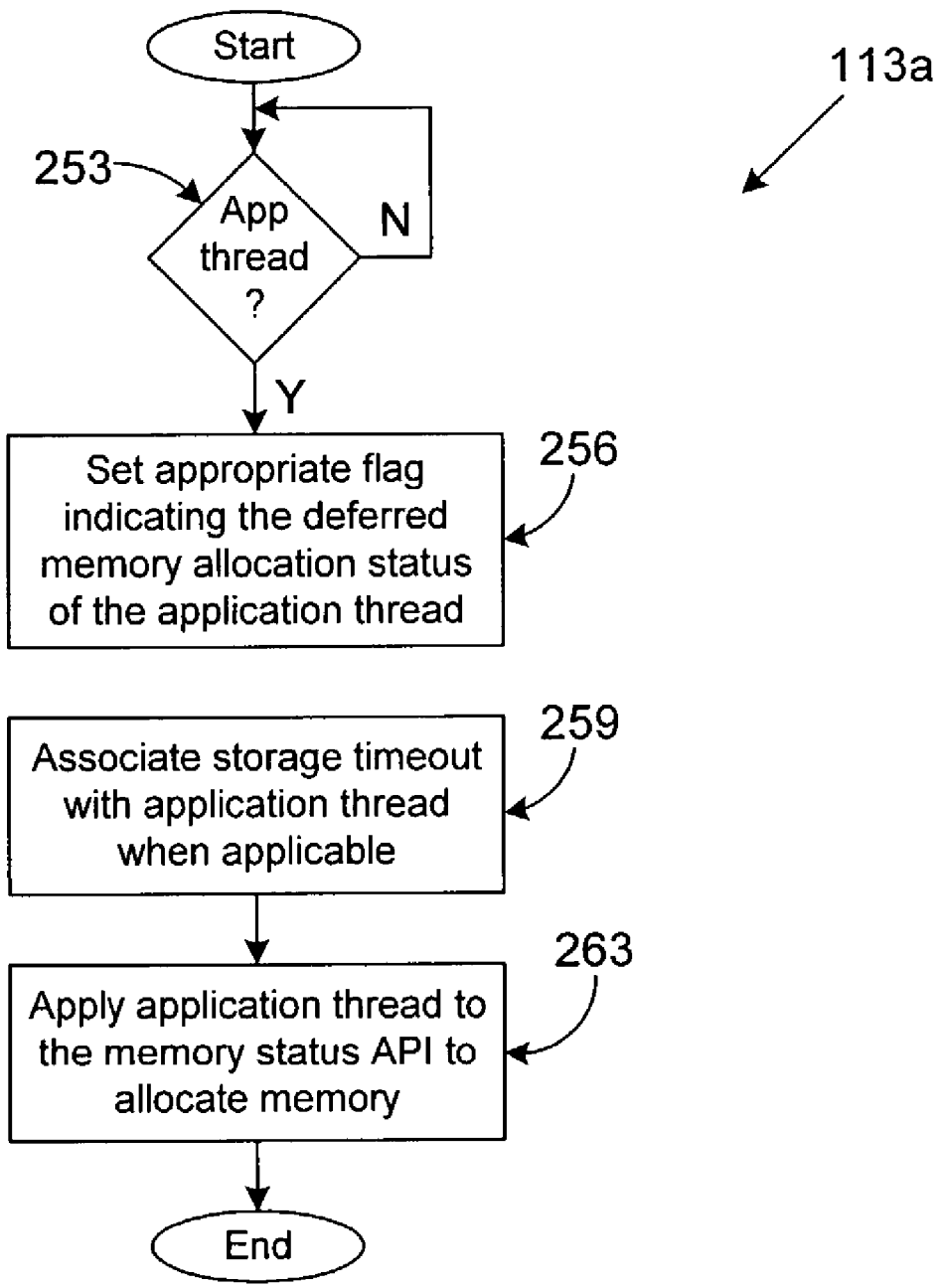
FIG. 4 is an exemplary flow chart that illustrates the operation of a portion of an application that requests memory allocation from the memory status API of FIG. 1.

Turning then to FIG. 4, shown is an exemplary flow chart of a portion of an application 113 denoted application portion 113a that is implemented to designate whether a particular application thread 131 is to be subject to deferred memory allocation. Alternatively, the flow chart of FIG. 4 may be viewed as depicting steps of a method implemented in the computer system 100 (FIG. 1) to properly designate an application thread 131 for deferred memory allocation including setting appropriate flags and assigning appropriate storage timeouts thereto.

Beginning in box 253, the portion of the application portion 113a determines whether an application thread 131 is to be designated for deferred memory allocation. If so, then in box 256, the appropriate flags are set in the application thread 131 that indicate whether or not the application thread 131 is subject to deferred memory allocation. Thereafter, in box 259, a storage timeout is associated with the application thread 131 if the application thread 131 is to be temporarily stored in the holding queue 129 (FIG. 1). Then, in box 263, the application thread 131 is caused to call the memory status API 116 (FIG. 1) to begin the process of allocating memory. Thereafter, the operation of the application portion 113a ends.

Although the memory status API 116 and the application portion 113a are embodied in software or code executed by general purpose hardware as discussed above, as an alternative they may also be embodied in dedicated hardware or a combination of software/general purpose hardware and dedicated hardware. If embodied in dedicated hardware, the memory status API 116 and the application portion 113a can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 2–4 show the architecture, functionality, and operation of an implementation of the memory status API 116 and the application portion 113a. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 2–4 show a specific order of execution, it is understood that the order of execution may differ from that which is depicted. For example, the order of execution of two or more blocks may be scrambled relative to the order shown. Also, two or more blocks shown in succession in FIGS. 2–4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the memory status API 116 and the application portion 113a comprise software or code, they can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the memory status API 116 and the application portion 113a for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A method for providing deferred memory allocation, comprising:
    attempting to allocate an amount of memory for an application thread;
    storing the application thread in a holding queue if the attempt to allocate the amount of memory was unsuccessful and if the application thread is designated for a deferred memory allocation; and
    periodically attempting to reallocate the amount of memory for the application thread while the application thread is stored in the holding queue.

2. The method of claim 1, further comprising determining whether the application thread is designated for the deferred memory allocation upon an occurrence of an unsuccessful attempt to allocate the amount of memory for the application thread.

3. The method of claim 1, further comprising returning a memory pointer to an application associated with the application thread upon a successful allocation of the amount of memory.

4. The method of claim 1, further comprising returning a failure to allocate the amount of memory to an application that originated the application thread if the attempt to allocate the amount of memory was unsuccessful and if the application thread is not designated for the deferred memory allocation.

5. The method of claim 1, further comprising designating the application thread for the deferred memory allocation, wherein a storage timeout is associated with the application thread that indicates a maximum period of time that the application thread can be stored in the holding queue.

6. The method of claim 5, further comprising: returning a failure to allocate the amount of memory to the application when the storage timeout has expired without the amount of memory being allocated for the application thread; and removing the application thread from the holding queue.

7. The method of claim 1, further comprising designating the application thread for the deferred memory allocation, wherein the deferred memory allocation further comprises a designation for an indefinite storage in the holding queue.

8. The method of claim 7, wherein the storing of the application thread in the holding queue if the attempt to allocate the amount of memory was unsuccessful and if the application thread is designated for the deferred memory allocation further comprises indefinitely storing the application thread in the holding queue until an occurrence of a successful attempt to reallocate the amount of memory for the application thread.

9. A program embodied in a computer readable storage medium for providing deferred memory allocation, comprising:
    code that attempts to allocate an amount of memory for an application thread;
    code that stores the application thread in a holding queue if the attempt to allocate the amount of memory was unsuccessful and if the application thread is designated for a deferred memory allocation; and
    code that periodically attempts to reallocate the amount of memory for the application thread while the application thread is stored in the holding queue.

10. The program embodied in a computer readable storage medium of claim 9, further comprising code that determines whether the application thread is designated for the deferred memory allocation upon an occurrence of an unsuccessful attempt to allocate the amount of memory for the application thread.

11. The program embodied in a computer readable storage medium of claim 9, further comprising code that returns a memory pointer to an application associated with the application thread upon a successful allocation of the amount of memory.

12. The program embodied in a computer readable storage medium of claim 9, further comprising code that returns a failure to allocate the amount of memory to an application that originated the application thread if the attempt to allocate the amount of memory was unsuccessful and if the application thread is not designated for the deferred memory allocation.

13. The program embodied in a computer readable storage medium of claim 9, further comprising code that designates the application thread for the deferred memory allocation, wherein a storage timeout is associated with the application thread that indicates a maximum period of time that the application thread can be stored in the holding queue.

14. The program embodied in a computer readable storage medium of claim 13, further comprising: code that returns a failure to allocate the amount of memory to the application when the storage timeout has expired without the amount of memory being allocated for the application thread; and code that removes the application thread from the holding queue.

15. The program embodied in a computer readable storage medium of claim 9, further comprising code that designates the application thread for the deferred memory allocation, wherein the deferred memory allocation further comprises a designation for an indefinite storage in the holding queue.

16. An apparatus for providing deferred memory allocation, comprising:
 a processor circuit having a processor and a memory;
 deferred memory allocation logic stored in the memory and executable by the processor, the deferred memory allocation logic comprising:
  logic that attempts to allocate an amount of memory for an application thread;
  logic that stores the application thread in a holding queue if the attempt to allocate the amount of memory was unsuccessful and if the application thread is designated for a deferred memory allocation; and
  logic that periodically attempts to reallocate the amount of memory for the application thread while the application thread is stored in the holding queue.

17. The apparatus of claim 16, wherein the deferred memory allocation logic further comprises logic that determines whether the application thread is designated for the deferred memory allocation upon an occurrence of an unsuccessful attempt to allocate the amount of memory for the application thread.

18. The apparatus of claim 16, wherein the deferred memory allocation logic further comprises logic that returns a memory pointer to an application associated with the application thread upon a successful allocation of the amount of memory.

19. The apparatus of claim 16, wherein the deferred memory allocation logic further comprises logic that returns a failure to allocate the amount of memory to an application that originated the application thread if the attempt to allocate the amount of memory was unsuccessful and if the application thread is not designated for the deferred memory allocation.

20. The apparatus of claim 16, wherein the deferred memory allocation logic further comprises logic that designates the application thread for the deferred memory allocation, wherein a storage timeout is associated with the application thread that indicates a maximum period of time that the application thread can be stored in the holding queue.

21. The apparatus of claim 20, wherein the deferred memory allocation logic further comprises: logic that returns a failure to allocate the amount of memory to the application when the storage timeout has expired without the amount of memory being allocated for the application thread; and logic that removes the application thread from the holding queue.

22. The apparatus of claim 16, wherein the deferred memory allocation logic further comprises logic that designates the application thread for the deferred memory allocation, wherein the deferred memory allocation further comprises a designation for an indefinite storage in the holding queue.

23. An apparatus for providing deferred memory allocation, comprising:
 means for attempting to allocate an amount of memory for an application thread;
 means for storing the application thread in a holding queue if the attempt to allocate the amount of memory was unsuccessful and if the application thread is designated for a deferred memory allocation; and
 means for periodically attempting to reallocate the amount of memory for the application thread while the application thread is stored in the holding queue.

24. The apparatus of claim 23, further comprising means for determining whether the application thread is designated for the deferred memory allocation upon an occurrence of an unsuccessful attempt to allocate the amount of memory for the application thread.

25. The apparatus of claim 23, further comprising means for returning a memory pointer to an application associated with the application thread upon a successful allocation of the amount of memory.

26. The apparatus of claim 23, further comprising means for returning a failure to allocate the amount of memory to an application that originated the application thread if the attempt to allocate the amount of memory was unsuccessful and if the application thread is not designated forte deferred memory allocation.

27. The apparatus of claim 23, further comprising means for designating the application thread for the deferred memory allocation, wherein a storage timeout is associated with the application thread that indicates a maximum period of time that the application thread can be stored in the holding queue.

* * * * *